(12) United States Patent
Dwersteg

(10) Patent No.: US 12,549,117 B2
(45) Date of Patent: Feb. 10, 2026

(54) STEPPER MOTOR STALL DETECTION

(71) Applicant: Analog Devices International Unlimited Company, Limerick (IE)

(72) Inventor: Bernhard Karl-Heinz Dwersteg, Rellingen (DE)

(73) Assignee: Analog Devices International Unlimited Company, Limerick (IE)

( * ) Notice: Subject to any disclaimer, the term of this patent is extended or adjusted under 35 U.S.C. 154(b) by 215 days.

(21) Appl. No.: 18/358,568

(22) Filed: Jul. 25, 2023

(65) Prior Publication Data

US 2025/0038684 A1    Jan. 30, 2025

(51) Int. Cl.
*H02P 8/38* (2006.01)
*H02P 6/182* (2016.01)
*H02P 8/22* (2006.01)

(52) U.S. Cl.
CPC .................. *H02P 8/38* (2013.01); *H02P 8/22* (2013.01); *H02P 6/182* (2013.01)

(58) Field of Classification Search
CPC ... H02P 6/182; H02P 8/34; H02P 8/12; G05B 19/00; G01R 19/00
See application file for complete search history.

(56) References Cited

U.S. PATENT DOCUMENTS

| | | | |
|---|---|---|---|
| 8,564,230 B2 | 10/2013 | Dwersteg et al. | |
| 9,030,150 B2 | 5/2015 | Dwersteg | |
| 9,112,439 B2 | 8/2015 | Larsson et al. | |
| 10,075,113 B2 | 9/2018 | Dwersteg | |
| 10,153,718 B2 | 12/2018 | Byers | |
| 11,437,943 B2 | 9/2022 | Dwersteg | |
| 2016/0013743 A1* | 1/2016 | Braat | H02P 8/22 318/696 |
| 2022/0123673 A1 | 4/2022 | Dwersteg | |
| 2024/0405701 A1* | 12/2024 | Shankar | H02P 8/38 |

FOREIGN PATENT DOCUMENTS

| | | |
|---|---|---|
| EP | 2966772 A1 | 1/2016 |
| EP | 3261245 A1 | 12/2017 |

OTHER PUBLICATIONS

Bernhard Karl-Heinz Dwersteg, "A Method and Circuit Arrangement for Controlling a Stepper Motor", unpublished U.S. Appl. No. 18/106,624, filed Feb. 7, 2023.

* cited by examiner

*Primary Examiner* — Said Bouziane
(74) *Attorney, Agent, or Firm* — Schwegman Lundberg & Woessner, P.A.

(57) ABSTRACT

A new method and circuit arrangement for operating a stepper motor in a control loop. Load values associated with a mechanical load of a stepper motor in operation are filtered to generate stall detection values. A step value is determined based on the difference between two stall detection values. The step value is compared to a threshold, and the stepper motor is determined to be in a stall condition based on the comparison between the step value to the threshold. This arrangement enables improved detection of stepper motor stall conditions when the stepper motor is operated at low velocities.

20 Claims, 9 Drawing Sheets

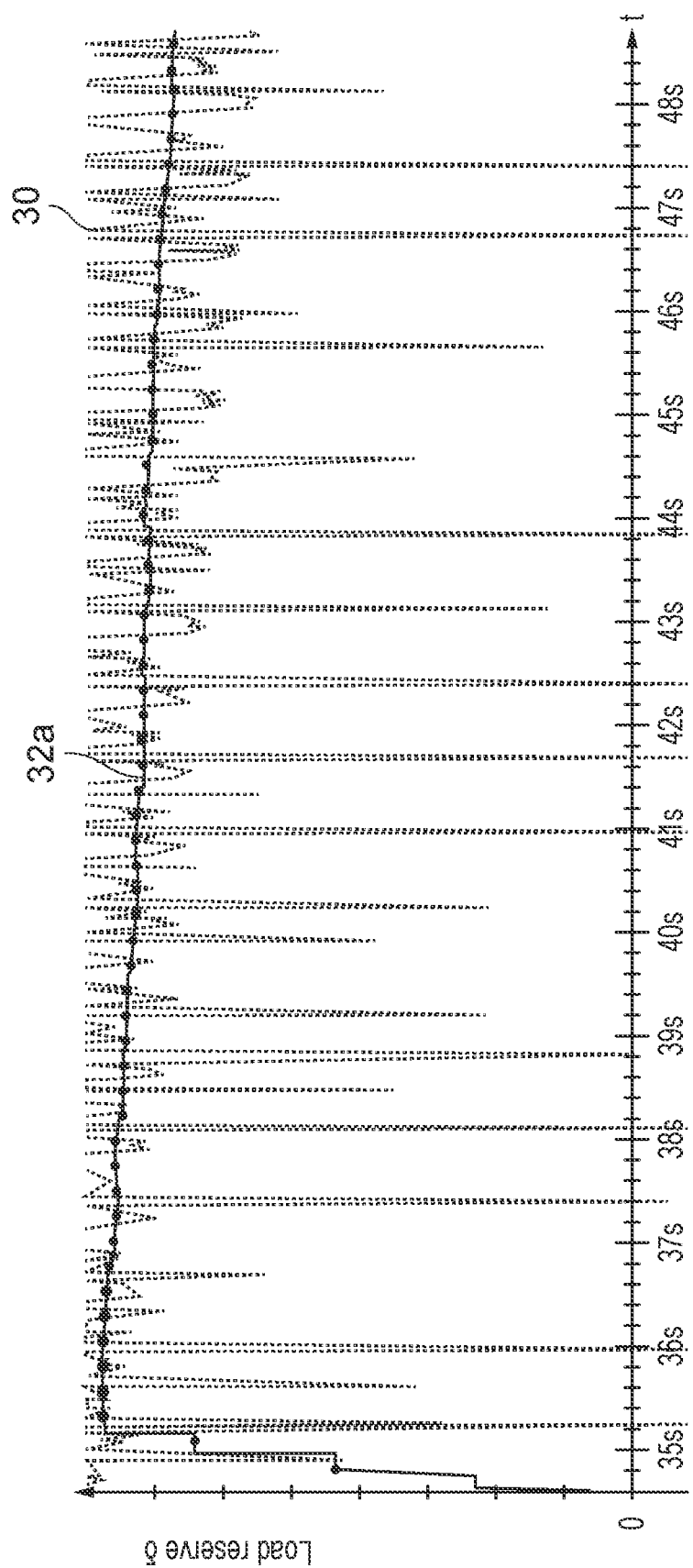

STEPPER MOTOR STALL DETECTION

FIELD

This application relates to methods and circuit arrangements for controlling a stepper motor. Specifically, this application relates to methods and circuit arrangements for controlling a stepper motor with a control loop to detect motor stall.

BACKGROUND

It is generally known that in stepper motors a magnetic rotor is turned stepwise by one or more small angles by means of a controlled rotating electromagnetic field which is generated by the motor's stator coils.

The maximum electrical power that can be driven into a stepper motor may be physically limited by: the motor (which defines the maximum current rating); the system supply voltage; and the maximum drive current of the motor drive circuit. Typically, stepper motors are over dimensioned so that the maximum current rating is greater than what is needed for the stepper motor's application.

Some stepper motors are operated in an open loop, i.e., the control system does not receive position or load feedback from the stepper motor. The stepper motor is controlled operating a driver stage to provide a target current to the motor coils to move a mechanical load. However, open loop operation does not provide any means in which to avoid motor stall (which leads to step loss), caused by an error between the commanded position and the actual rotor position.

Sensor-based closed loop systems are known to provide means to avoid motor stall. Such methods are known to receive an input from the stepper motor itself using sensors, such as encoders which can detect the position of the rotor (which can be compared to the successively commanded position). Sensor-based closed loop methods of controlling stepper motors have higher associated implementation cost and design effort than open loop methods.

It can be desired to rotate the motor with as far as possible small step angles, in order to achieve an as high as possible resolution and exactness of the positioning and a uniform course of the motor torque. For these reasons, instead of the known full-step and half-step operation, the so called micro-step operation may be preferred in which the currents flowing through the motor coils are not only switched on and off, but also increase and decrease in a certain manner. The resolution and the uniformity with which the stepper motor conducts the micro-steps is in this case substantially dependent on the number of different current amplitude values with which the motor coils can be operated and how exactly these can be kept. Usually, it is most appropriate to excite the motor coils with a sinusoidal—and cosine-wave, respectively, because with this a very continuous and jerk-free rotation of a microstep-optimized motor and by this a calm motor operation can be obtained.

For electrically controlling stepper motors, especially in the micro-step operation, known chopper methods are used. One chopper method is a voltage-based (i.e. voltage-controlled or voltage-regulated) operating mode in which the required coil current is generated by means of a voltage which is applied to the motor coils and which is adjusted by changing its amount (or its amplitude) and its direction (or polarity).

However, there exists problems with motor stall of stepper motors. If the mechanical load coupled to the stepper motor increases beyond expectations, then the stepper motor will likely stall. Motor stall occurs when a stepper motor (and/or associated circuitry) is operated beyond its power limits. Typically, to avoid motor stall, stepper motors are over-dimensioned such that they can tolerate a much larger mechanical load than expected. However, over-dimensioning requires additional resources (e.g., a larger, heavier, more expensive stepper motor, and a larger, more expensive driver circuitry) to remain compliant during larger than expected mechanical load (i.e., outliers). Further, if a stepper motor stalls and it is not detected, then the controller may assume that the stepper motor is in a first position, when it is actually in a second position.

SUMMARY OF THE DISCLOSURE

As a brief non-limiting overview of the invention, the present disclosure provides a new method and circuit arrangement for operating a stepper motor in a control loop. Load values associated with a mechanical load of a stepper motor in operation are filtered to generate stall detection values. A step value is determined based on the difference between two stall detection values. The step value is compared to a threshold, and the stepper motor is determined to be in a stall condition based on the comparison between the step value to the threshold. This arrangement enables improved detection of stepper motor stall conditions when the stepper motor is operated at low velocities.

According to a first aspect there is provided a method of operating a stepper motor, the method comprising:
  operating the stepper motor in a control loop;
  receiving load values associated with a mechanical load of the operating stepper motor;
  filtering the load values to generate stall detection values;
  determining a step value based on the difference between two stall detection values;
  comparing the step value to a predetermined threshold; and
  determining that the stepper motor is in a stall condition based on the comparison between the step value to the predetermined threshold.

Optionally, the stepper motor comprises at least a first motor coil and a second motor coil.

Optionally, filtering the load values comprises averaging the load values over at least 90 degrees of an electrical cycle of current in a motor coil of the stepper motor.

Optionally, filtering the load values comprises averaging the load values over one electrical cycle of current in a motor coil of the stepper motor.

Optionally, comparing the step value to the predetermined threshold comprises comparing the rate of change in the stall detection values to the predetermined threshold. Optionally, the predetermined threshold is a rate of change threshold.

Optionally, the receiving load values comprises: sampling a first motor coil current from the first stepper motor coil; and sampling a second motor coil current from the second stepper motor coil.

Optionally, each load value is proportional to a load angle of the stepper motor.

Optionally, the load values are associated with the mechanical loads detected by the operating stepper motor.

Optionally, filtering the load values comprises averaging the load values.

Optionally, determining the step value is further based on the difference between two consecutive stall detection values.

Optionally, further comprising stopping the stepper motor in response to determining that the stepper motor is in a stall condition.

Optionally, determining that the step value is based on the difference between two stall detection values comprises determining the rate of change in the stall detection values.

Optionally, the two stall detection values are a first and second stall detection values, and the step value is a first step value. Optionally, the method comprises determining a second step value based on the difference between the second stall detection value and a third stall detection value. Optionally, the method comprises comparing the combination of the first and second step values to the predetermined threshold. Optionally, the method comprises determining that the stepper motor is in a stall condition based on the comparison between the combination of the first and second step values to the predetermined threshold.

Optionally, the two stall detection values are a first and second stall detection values, the predetermined threshold is a first predetermined threshold, and the step value is a first step value. Optionally, the method comprises determining a second step value based on the difference between the second stall detection value and a third stall detection value. Optionally, the method comprises comparing second step values to a second predetermined threshold. Optionally, the method comprises determining that the stepper motor is in a stall condition based on: the comparison between the first step value to the first predetermined threshold; and, the comparison between the second step value to the second predetermined threshold.

Optionally, operating the stepper motor in a control loop comprises operating the stepper motor at less than 60 revolutions per minute (RPM), preferably less than 30 RPM, and more preferably less than 10 RPM.

According to a second aspect there is provided a circuit arrangement for operating a stepper motor in a control loop, the stepper motor comprising at least a first motor coil and a second motor coil, the circuit comprising:
a controller, configured to:
operate the stepper motor at a velocity:
receive load values associated with a mechanical load of the operating stepper motor;
filter the load values to generate stall detection values;
determine a step value based on the difference between two stall detection values;
compare the step value to a predetermined threshold; and
determine that the stepper motor is in a stall condition based on the comparison between the step value to the predetermined threshold.

Optionally, the stepper motor comprises at least a first motor coil and a second motor coil.

Optionally, the controller is further configured to stop the stepper motor in response to determining that the stepper motor is in a stall condition.

Optionally, filtering the load values comprises averaging the load values over at least 90 degrees of an electrical cycle of current in a motor coil of the stepper motor.

Optionally, filtering the load values comprises averaging the load values over one electrical cycle of current in a motor coil of the stepper motor.

Optionally, comparing the step value to the predetermined threshold comprises comparing the rate of change in the stall detection values to the predetermined threshold, wherein the predetermined threshold is a rate of change threshold.

Optionally, the receiving load values comprises sampling a first motor coil current from the first stepper motor coil; and sampling a second motor coil current from the second stepper motor coil.

Optionally, each load value is proportional to a load angle of the stepper motor.

Optionally, the load values are associated with the mechanical loads detected by the operating stepper motor.

Optionally, filtering the load values comprises averaging the load values.

Optionally, determining the step value is further based on the difference between two consecutive stall detection values.

Optionally, determining that the step value is based on the difference between two stall detection values. Optionally, the controller is further configured to: determine the rate of change in the stall detection values.

Optionally, the two stall detection values are a first and second stall detection values, and the step value is a first step value. Optionally, the controller is further configured to: determine a second step value based on the difference between the second stall detection value and a third stall detection value. Optionally, the controller is further configured to compare the combination of the first and second step values to the predetermined threshold. Optionally, the controller is further configured to determine that the stepper motor is in a stall condition based on the comparison between the combination of the first and second step values to the predetermined threshold.

Optionally, the two stall detection values are a first and second stall detection values, the predetermined threshold is a first predetermined threshold, and the step value is a first step value. Optionally, the controller is further configured to determine a second step value based on the difference between the second stall detection value and a third stall detection value. Optionally the controller is further configured to compare second step values to a second predetermined threshold. Optionally, the controller is further configured to determine that the stepper motor is in a stall condition based on: the comparison between the first step value to the first predetermined threshold; and, the comparison between the second step value to the second predetermined threshold.

Optionally, operating the stepper motor in a control loop comprises operating the stepper motor at less than 60 revolutions per minute (RPM), preferably less than 30 RPM, and more preferably less than 10 RPM.

The method and circuit arrangement of the first and second aspects may provide improved stall detection. The present aspects thus allow a stall event to be detected at stepper motor velocities 4 to 10 times lower than known sensorless examples (e.g., stall may be reliably detected at 2 RPM). The present aspects thus allow a stall detection which is insensitive to slow changes like thermal heat up of the motor coils leading to increased coil resistance.

FIGURES

FIG. 4b illustrates a graph of the relationship between the two motor coil currents of FIG. 4a.

FIG. 4a illustrates a graph of a relationship between a target load angle and an absolute value of the coil current vector in the motoring quadrant of a stepper motor.

FIG. 8 shows a graph with a load reserve (8) amplitude on the y-axis and time (t) on the x-axis, wherein the mechanical load on the stepper motor is constant.

DEFINITIONS

Figure 1:
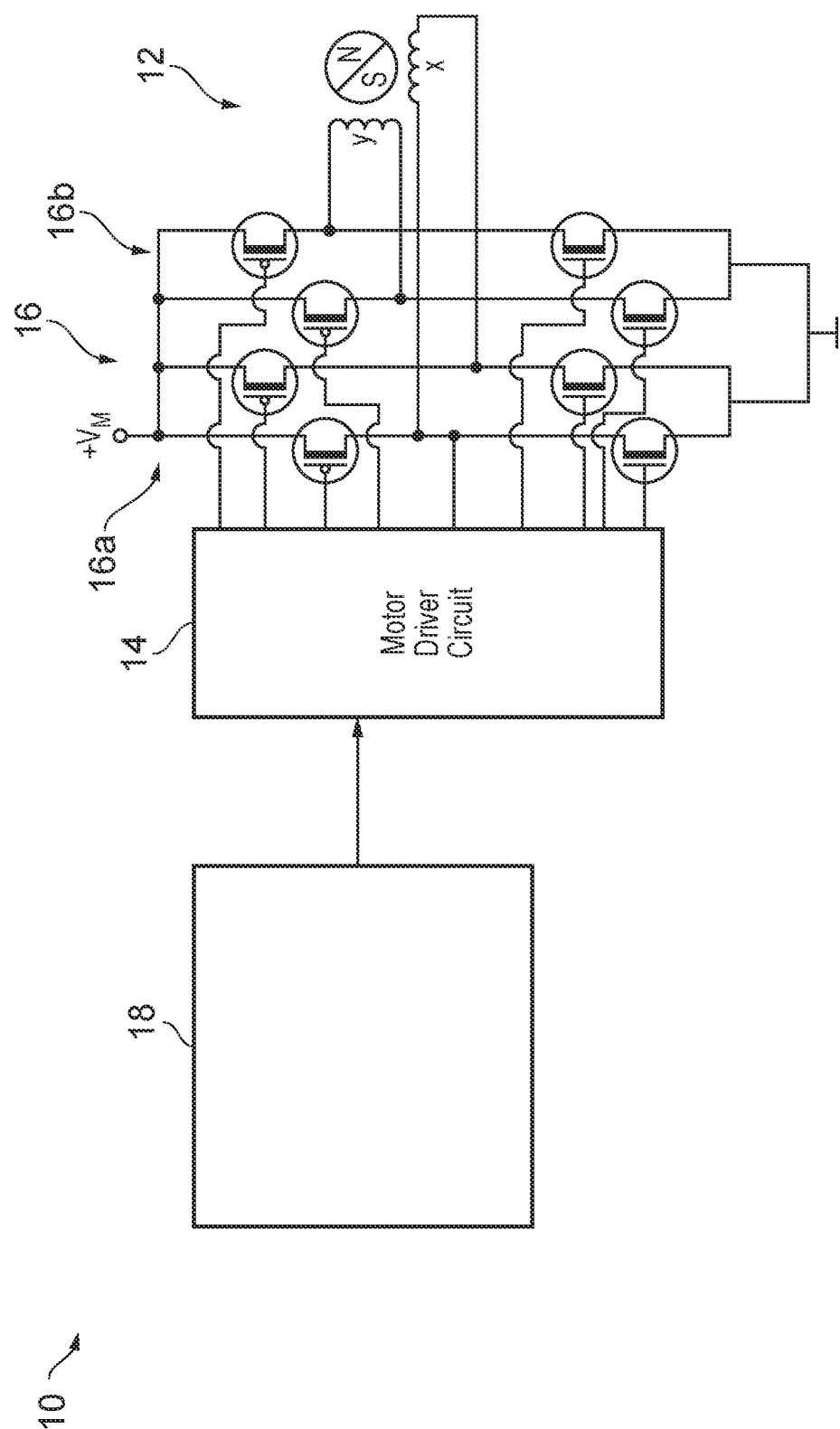
FIG. 1 illustrates a schematic block wiring diagram of a circuit arrangement for operating an electric motor in an open loop operating mode.

An operating mode with a control loop (i.e., an industrial control loop, or closed loop control) generally includes a process variable sensor for sensing a variable of a process, a controller for receiving an input signal representative of the process variable and for generating an output signal based on the input signal and a setpoint signal representing a desired value of the process variable, and an actuation device for receiving the output signal and for adjusting the process in response to the output signal. The controller uses the control algorithm to compare the setpoint signal to the input signal from the previous iteration of the loop (e.g., at time t=−1) and to generate the output signal for the current iteration of the loop (e.g., at time t=0). The actuation device adjusts the process in order to bring the process variable towards the desired value represented by the setpoint signal, which will be used as the input for the next iteration of the loop (e.g., at time t=1).

The controller may be implemented as a computer program executing on a processor, and the process variable sensor, actuation device, and setpoint input may be connected to the controller via electrical or communication links.

A voltage-based operating mode with a control loop is a control loop operating mode which uses voltage signals to generate a control signal for operating a device. A current-based operating mode with a control loop is a control loop operating mode which uses current signals to generate a control signal for operating a device.

Regulating involves correcting for an error between the commanded setpoint and the actual value based on some type of feedback. That is, the output of a regulator is determined which, upon a new iteration of a control loop adjusts the actual value to the commanded setpoint.

Operating the stepper motor involves providing a voltage/current to the motor coils of the stepper motor to induce movement in the rotor/stator of the stepper motor.

Over dimensioning is a standard practice in industry in which an oversized (on the NEMA scale) stepper motor is selected for an industrial/consumer application to ensure compliance.

A mechanical load is the load which is coupled to the stepper motor's rotating element (typically the rotor).

Motor stall occurs when a stepper motor (and/or associated circuitry) is operated beyond its power limits. For example, if the payload is too large for the motor's rotor to rotate as commanded. This results in step loss because the stepper motor is unable to 'step' when commanded causing an error between the commanded position of the stepper motor's rotor and the actual rotor position. A motor stall event is an event which causes the stepper motor to stall and possibly step loss to occur (if no feedback on the actual rotor position is received by the controller, e.g., in a sensorless operating mode).

The stepper motor is in a stall condition when the stepper motor has stalled, or when the stepper motor is at risk of stalling (i.e., if the mechanical load increases further, then the stepper motor will stall) and the controller changes the operation of the stepper motor in response to the stall condition.

An electrical cycle (i.e., electrical period) is a term of the art and may be defined by each repetition of an electrical waveform (e.g., current, voltage). For example, for a sinusoidal waveform, the electrical cycle is 360 degrees. Non-sinusoidal waveforms are possible.

DETAILED DESCRIPTION

A problem with a known stepper motors operated in a control loop, is motor stall. A stepper motor is typically operated to target an operating velocity tailored to the stepper motor's application. If the mechanical load coupled to the stepper motor increases beyond expectations, then the stepper motor will likely stall. Typically, to avoid motor stall, stepper motors are over-dimensioned such that they can tolerate a much larger mechanical load than expected. However, over-dimensioning requires additional resources (e.g., a larger, heavier, more expensive stepper motor, and a larger, more expensive driver circuitry) to remain compliant during larger than expected mechanical load (i.e., outliers). Further, if a stepper motor stalls and it is not detected, then the controller may assume that the stepper motor is in a first position, when it is actually in a second position. This mismatch can cause the controller to operate the stepper motor with reduced accuracy and efficiency.

Specifically, at low motor velocities in a back EMF (BEMF) voltage feedback control loop, the back EMF voltage becomes very small compared to parasitic effects like voltage drop in the motor coils inner resistance. These parasitic effects, especially the value of the motor coil resistance, may change during operation, e.g. due to heat up of the coils leading to a higher resistance value. This effect, and an increased noise on the extracted BEMF signal, leads to difficulty in detecting stall conditions at lower motor velocities.

Embodiments of the invention solve the above problems associated with previous stepper motor control methods.

As a brief non-limiting overview of the invention, the present disclosure provides a method and circuit arrangement for operating a stepper motor in a control loop. The stepper motor is operated, for example, to a velocity. If the mechanical load coupled to the stepper motor increases then, to detect motor stall, the method monitors a torque load or a representation of the torque load (e.g. load-based scaled motor coil current). The torque load is filtered and the resulting filtered values are compared to each other to detect a rate of change in the filtered values. This enables the stepper motor to detect a stall event by comparing the rate of change in the filtered values to a predetermined threshold. The present disclosure thus allows a stall event to be detected at stepper motor velocities 4 to 10 times lower than other sensorless examples (e.g., stall may be reliably detected at 2 RPM). It uses filtering of the sensorless load value to get a much more stable and noise-free read out and reacts to a change in the load value corresponding to hitting a mechanical obstacle, rather than to an absolute load. This makes it insensitive to slow changes like thermal heat up of the motor coils leading to increased coil resistance.

Beneficially, the disclosed methods may also be implemented with significantly reduced implementation cost and design effort. That is, the method may be applied directly to a closed loop stepper motor system without changing the existing operating control system, but also benefit from increased resilience to motor stall events.

Thus, the reliability of any stepper motor system the method is applied to, may be improved as a result. The torque load or representation of the torque load will be referred to herein as a load value.

FIG. 1 shows an example of a schematic block wiring diagram of a circuit arrangement 10 for an electric motor, such as a stepper motor. The circuit arrangement 10 shows a stepper motor 12 controlled by a controller 18. The stepper motor 12 is controlled with a motor driver circuit 14, for example a voltage chopper. The motor driver circuit 14 generates a drive voltage for each coil of the stepper motor 12, for example the drive voltage may be a pulse width modulation (PWM) voltage for operating the stepper motor 12.

In a simple case of a two-phase stepper motor 12 it may be assumed that one of the two coils (e.g., coil x) is subjected to a sinusoidal current course and the other coil (e.g., coil y) is supplied with a current course which is phase-shifted by 90° and thus co-sinusoidal. The stepper motor 12 may also be controlled in micro-step operation with a PWM voltage which results in a substantially sinusoidal motor coil current within the coils x, y. However, the following considerations also apply accordingly in the alternative case of: non-sinusoidal motor coil current; stepper motors with the same or a different number of phases; an associated phase shift of the motor coil currents relative to one another which is not 90°; and/or a stepper motor operated in a full-, a half-, or a micro-step operation.

A PWM voltage may be generated from a motor supply voltage, such that the amplitude of the motor supply voltage defines the amplitude of the PWM voltage. In particular, the motor supply voltage can be pulse-width-modulated and applied with corresponding polarity to the motor coils x, y. The duty factor of this modulation being controlled or regulated in such a way that the resulting effective voltage across the motor coils each has an amount which causes an instantaneous motor coil current value to flow. Alternatively, other methods may be used to cause the instantaneous target motor coil currents to flow. The control of the PWM may be based on a voltage-based control signal using known methods.

The circuit arrangement 10 comprises, as components known per se, an integrated motor driver circuit 14, with which via outputs, first and second bridge circuits 16a, 16b are controlled. The bridge circuits 16 are arranged between a supply voltage +VM and ground. In order to operate the stepper motor, a first PWM voltage signal is applied to the coil x and a second PWM voltage signal is applied to the coil y. The motor driver circuit 14 receives a voltage or current-based control signal in order to control the amplitude or the amount of the voltage applied to each coil, or the duty factor of the PWM voltages, e.g. via a controller 18. Since these motor driver circuit 14 units are known per se, they do not need to be described in more detail.

The stepper motor 12 can operate such that the power on its rotated motor shaft with a certain applied external force scales linearly with the velocity:

$$P_{load} = \frac{\Delta E_{load}}{\Delta t} = \tau * \omega = F * r * \omega \qquad (1)$$

where torque $\tau$, angular velocity $\omega$, external force F, and r is the radius of the stepper motor shaft.

Figure 2:
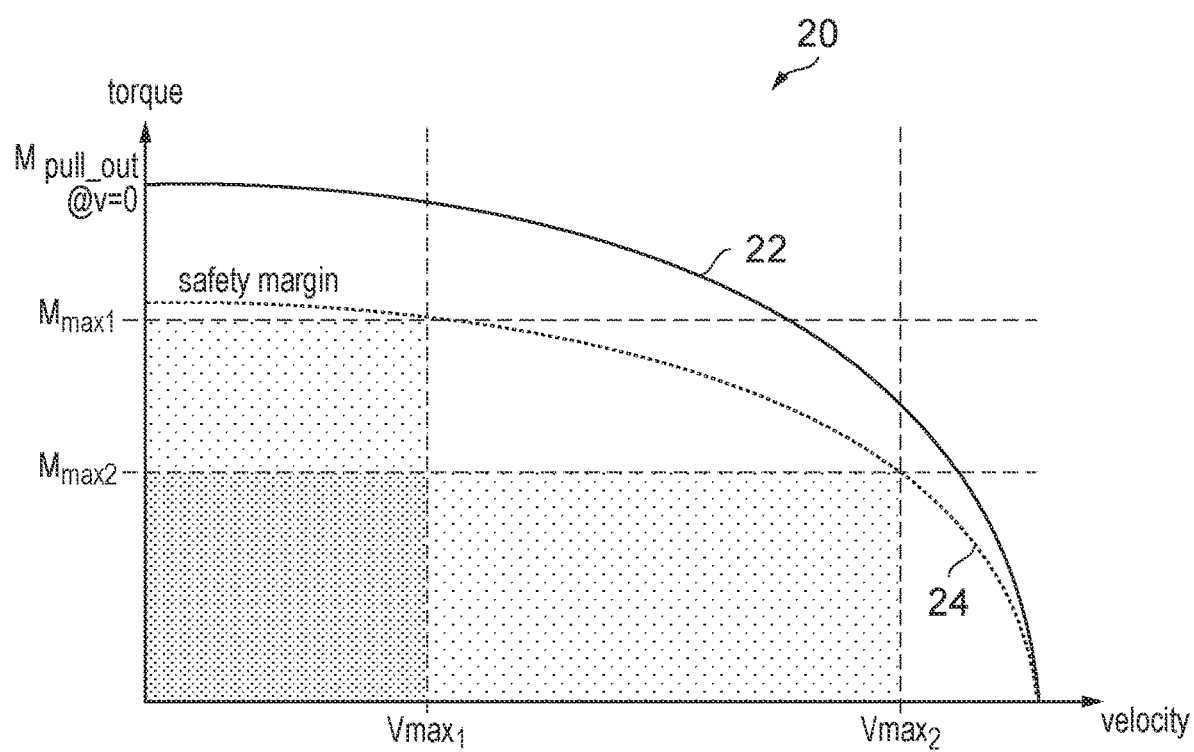
FIG. 2 illustrates a graph representing an open loop operating mode of an electric motor, showing velocity against torque.

FIG. 2 shows a representation of an open loop operating mode on a graph 20. The velocity of the stepper motor is shown on the x-axis, and the torque of the stepper motor is shown on the y-axis.

The graph 20 shows a line 22 representing the maximum power output of the stepper motor 12. The line 22 also represents the limitation in electrical power and the dependency of the mechanical power on the velocity in combination with the external applied force. Thus, there is a trade-off between the maximum allowed velocity and the maximum allowed torque. If the stepper motor 12 is operated to exceed the line 22 then motor stall will occur. All stepper motors may be characterised such that the line 22 represents the maximum power output of any stepper motor and can be determined (e.g., through experimentation) or may be generally readily available (e.g., from datasheets).

It is generally known to operate stepper motors in open loops with a safety margin shown by the dashed safety margin line 24. The purpose of the safety margin line 24 is to set an artificial limit to the drive operation of the stepper motor 12 so that if a transient increase in the mechanical load is provided to the stepper motor, then torque can increase beyond the safety margin line 24, but within the line 22, temporarily without motor stall. This reduces the risk of motor stall, however, this also reduces the power handling of the stepper motor 12 because it is not being operated near its maximum power. This leads to system designers over dimensioning stepper motors for certain applications, and in particular maintaining a large torque safety margin at low velocities.

The graph 20 shows how a high torque requirement $M_{max_1}$ limits the maximum allowed velocity to $V_{max_1}$. In contrast the high velocity requirement of $V_{max_2}$ limits the maximum allowed torque to $M_{max_2}$.

A problem with a known operating mode is that if a control system is operated to target a specific velocity and a load on the stepper motor is increased, then to maintain the target velocity the torque on the stepper motor must increase. The combination of velocity and torque may require more power than the driver circuit can provide (or the stepper motor is rated for) which may result in motor stall, also called step loss.

In addition, known closed loop systems may be implemented which use encoders to detect the position of the rotor of the stepper motor 12. Such systems may remove the need for a safety margin and operate a stepper motor close to the line 22. However, such systems require significantly higher design effort, die space, and cost to implement. Moreover, encoders may not be suitable for all applications and may require additional calibrations.

Examples of the invention solve the above problems with stepper motor control methods. Examples of the invention are described below.

Figure 3:
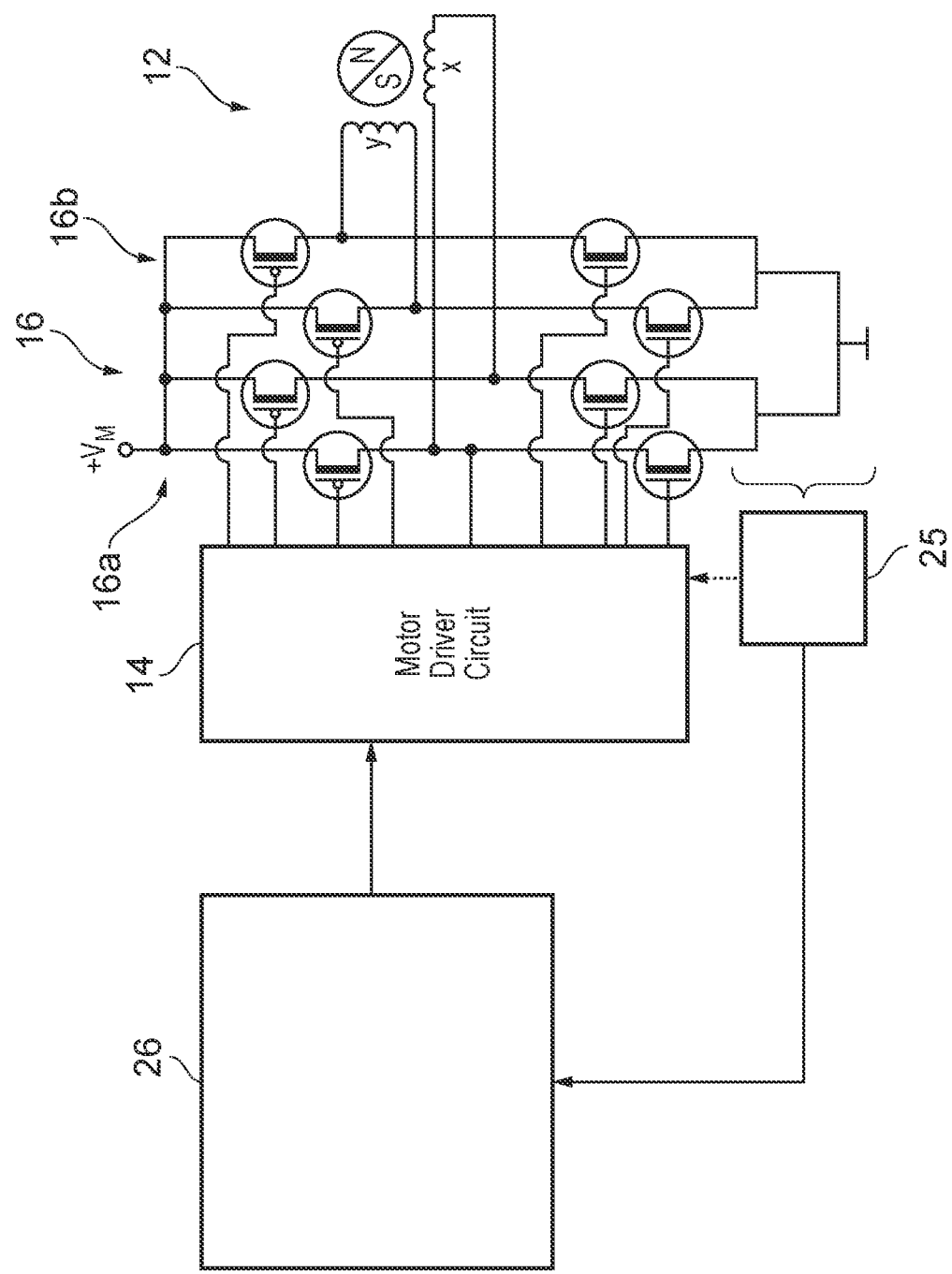
FIG. 3 illustrates a schematic block wiring diagram of a circuit arrangement for operating an electric motor in a control loop.

FIG. 3 shows a circuit arrangement 28 according to an example of the invention. The circuit arrangement 28 of FIG. 3 is similar to the circuit arrangement 10 of FIG. 1 and for brevity the following description will focus on the differences and like parts have been given the same reference numerals.

The circuit arrangement 28 operates the stepper motor 12 in a control loop. The control loop may be implemented with, for example, a hysteresis controller or a PI regulator. A controller 26 receives a feedback signal from the stepper motor 12, e.g., a coil current (for one or more motor coils of the stepper motor 12), and/or a sensor measurement from an encoder, etc., via a feedback means 25.

For example, the controller 26 may receive a measurement of the actual motor coil current to regulate a duty factor of the PWM voltage applied to the respective motor coil via a control loop (that is, a voltage-based operating mode with a control loop). The actual motor coil current can be detected by the feedback means 25, for example, by means of an analog-to-digital converter (ADC) in order to control the amplitude or the amount of the voltage applied to the coil, or the duty factor of the PWM voltage, e.g. via a regulator, preferably a PI-regulator. Alternatively, the circuit arrangement 28 may operate in a current-based operating mode with a control loop. The ADC can sample the motor coil currents such that the load values comprise samples of a first motor coil current from the first stepper motor coil; and, samples of a second motor coil current from the second stepper motor coil.

Optionally, if the control loop is a sensor-free closed loop, then the motor driver circuit 14 may also receive as an input a coil current via the feedback means 25 to aid in operating the stepper motor 12.

An operation of the stepper motor 12 will now be described in relation to FIGS. 4 to 6. The controller 26 may be configured to implement a method which may output a signal suitable for operating the stepper motor 12 in accordance with examples of the invention.

Figure 4A:
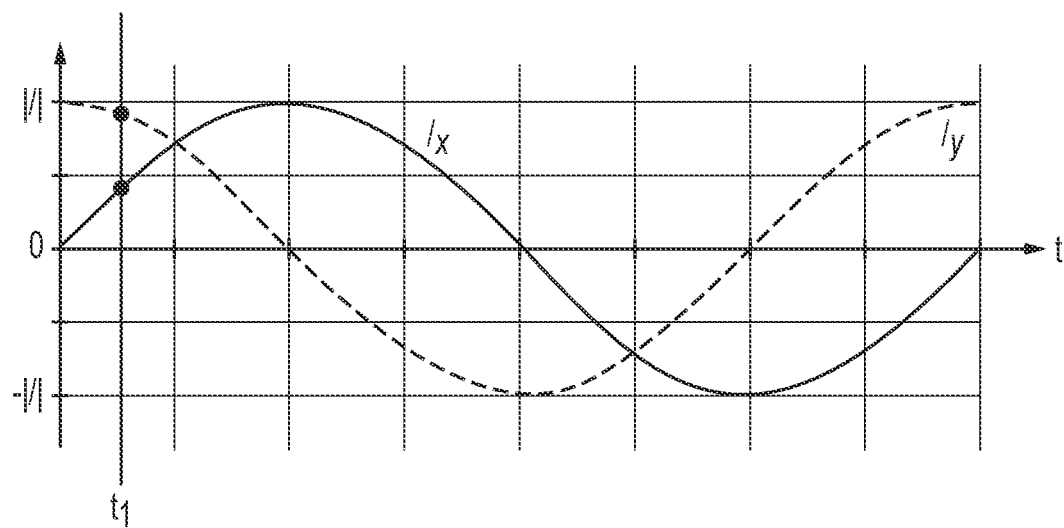
FIG. 4a illustrates a graph of two motor coil currents, one from each motor coil, over a time period.
Figure 4B:
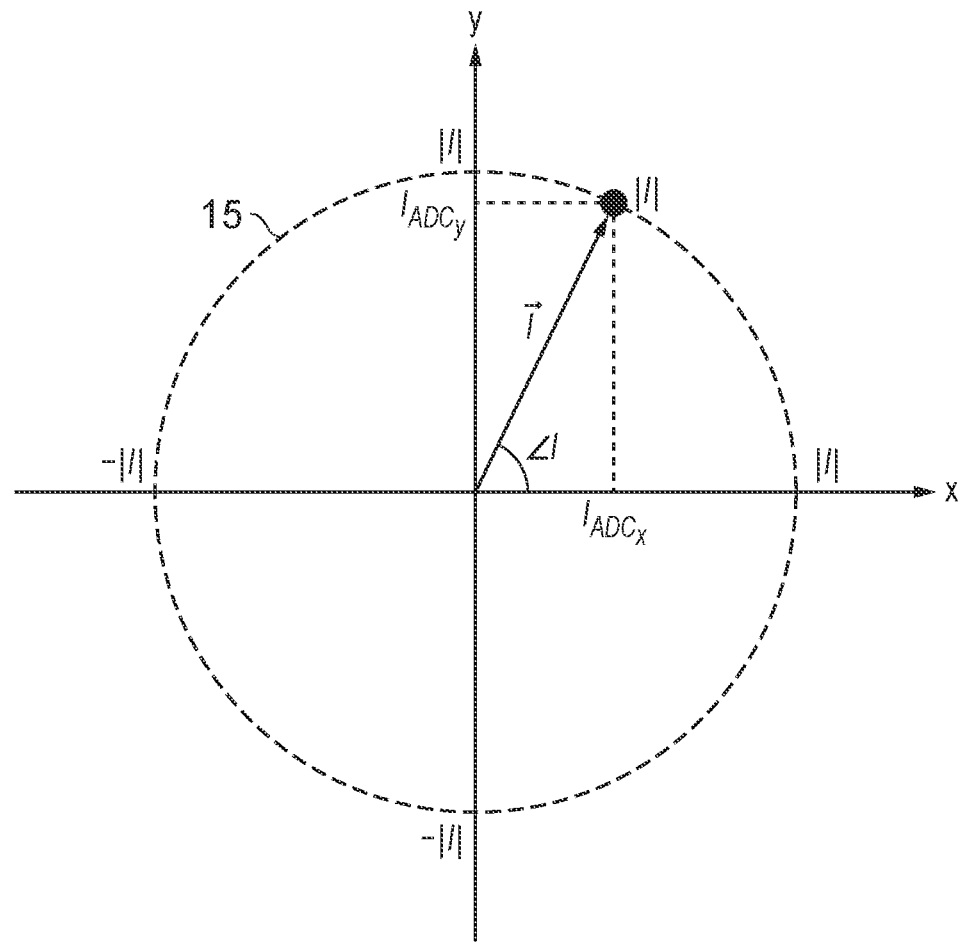

FIG. 4a shows a simplified example of the actual motor coil currents $I_x$, $I_y$ on each coil over a time period when the stepper motor is micro-stepped. At time $t_1$ the ADC 25 may sample the actual motor currents $I_x$, $I_y$ to generate a first and second motor coil currents $I_{ADC_x}$, $I_{ADC_y}$ respectively. FIG. 4b shows a graphical representation of the first and second motor coil currents $I_{ADC_x}$, $I_{ADC_y}$ on a graph with an x-axis representing the phase of the coil x, and a y-axis representing the phase of the coil y. The phase angle relationship between the first motor coil current $I_{ADC_x}$ and the second motor coil current $I_{ADC_y}$ is represented by the shape of a dashed circle 15. The phase angle relationship may be predetermined by the shape of the waveforms in FIG. 4a and/or the phase angle between actual motor coil currents $I_x$, $I_y$. This may be predetermined via knowledge of the stepper motor 12 through known means per se. Therefore, the absolute value of the coil current vector |I| can be determined by measuring the first and second motor coil currents $I_{ADC_x}$, $I_{ADC_y}$. Specifically, $$|I|\sqrt{I_{ADC_x}^2 + I_{ADC_y}^2}.$$

The coil current phase angle ∠I can be determined between the coil current vector $\vec{I}$ and a pre-defined reference angle. For example, the pre-defined reference angle may be 0°, or any other pre-determined angle. Thus, the coil current vector $\vec{I}$ is defined by the absolute value |I| and the coil current phase angle ∠I. Alternatively, the coil current phase angle ∠I may be calculated based on the first and second motor coil currents $I_{ADC_x}$, $I_{ADC_y}$ measurements using an ATAN2 function. It will be appreciated that the phase angle relationship between the first motor coil current $I_{ADC_x}$ and the second motor coil current $I_{ADC_y}$ shown is a result of micro-stepping (i.e., the controller 26 generates or receives a micro-step sequencer signal for operating the stepper motor).

Current probes may be in series with a respective coil x, y (i.e., at the connection of the first and second bridge circuits 16a, 16b to the coils x, y). Additionally or alternatively, the motor coil currents $I_x$, $I_y$ flowing through the coils x, y may be measured by probes at the base point (e.g., source of a bridge MOSFET) of the bridge circuit 16. The current probes may be coupled to the ADC 25 to measure the first and second motor coil currents $I_{ADC_x}$, $I_{ADC_y}$.

The load value (e.g., load angle, load reserve, or any representation of the torque load) may be (directly, inversely, or indirectly) proportional to a mechanical load on the rotor of the stepper motor 12, such that if the rotor requires more torque to rotate at a given velocity, then the load value will increase. The load value may be a motor coil current or a load angle of the stepper motor 12. The load value therefore has a maximum load value $L_{max}$ which may be equivalent to the maximum power output of the stepper motor 12 (i.e., a stall load value: a load value which results in motor stall of the stepper motor 12), or a safety margin (reduced in comparison to FIG. 2). Each load value may be proportional to a load angle of the stepper motor, or could be proportional to an encoder signal.

In a stepper motor the direction of the rotor is defined by its magnetization. If there is no mechanical load, the angle of the rotor corresponds to the main direction of the magnetic field that is generated by the coils—this corresponds to a load angle of 0°. If the direction of the magnetization of the rotor in a two-pole motor is orthogonal to the main direction of the magnetic field that is generated by the coils, then this corresponds to a load angle of 90°. This means that in a two-pole motor the load angle, when the motor is at a standstill, corresponds directly to the mechanical deflection by the neutral position on the motor shaft caused directly prior to the torque (without load and with a load angle of 0°). In higher pole motors the load angle is an integral multiple of this mechanical deflection by the neutral position. In high pole-count motors the determination of the load angle therefore would require very high resolution rotary pulse generators and very precise current measurements.

There are many load angle calculation schemes known in the field of sensorless operated PMSM (permanent magnet synchronous motor) motor algorithms. The load angle calculation may determine a load reserve δ. The load reserve δ gives a measure for the amount of torque still available and not used by mechanics of a stepper motor at the given motor current. If the load reserve δ is approximately 0°, then the load angle is approximately 90°. That is, the load reserve δ=the load angle −90°. Thus, either the load angle and/or the load reserve δ may be used.

The determination of the mechanical motor load may be represented by the load angle based on the voltage that is counter-induced in the motor coils by the rotation of the rotor (Back-electromotive force, Back-EMF, or counter-electromotive force, CEMF) and especially on the amount of this Back-EMF, which is position controlled in order to achieve a specified current flow in the respective stepper motor coil. The Back-EMF voltage angle may be further calculated based on any of: the supply voltage +VM; the resistance R of the stepper motor coil x; the resistance R of the stepper motor coil y; and the inductance L of the stepper motor coil x; the inductance L of the stepper motor coil y. A stepper motor coil x, y may be typically modeled as a voltage source (in opposition to the coil driving voltage (e.g., PWM voltage signals) and a resistor. Advantageously, the supply voltage may correspond to the amplitude/scaling of PWM voltage signals, which can improve the calculation of the Back-EMF voltage angle. A stepper motor coil may be modeled as a voltage source (in opposition to the coil driving voltage), a resistor, and an inductor.

The controller 26 enables a load angle of the stepper motor 12 to be detected in a sensor-free manner. For example, a load angle may be calculated based on the absolute value |I|, the coil current phase angle ∠, and a previous [voltage-based] control signal output from the controller 26. Any timing delays may be neglected or compensated for with known means per se.

The controller 26 receives load values associated with a mechanical load of the operating stepper motor. That is, the load values may be based on a mechanical load of the operating stepper motor. At relatively high velocities, the load values may provide a good indicator of the stall condition of the stepper motor. However, at low motor velocities (such as less than 10, less than 30 RPM, or less than 60 RPM) the received load values can be compromised by parasitic effects. The low motor velocity at which the received load values can be compromised by parasitic effects depends on (and can be determined based on) the motor characteristics and change in motor temperature, although in practice the disclosed method may be particularly beneficial if stall detection is required at velocities which are likely to approach said low motor velocities. That is, load angle calculation schemes all generally function poorly at low motor velocities and provide a poor indicator of motor stall. For example, at low motor velocities, the Back-EMF signal is very weak compared to each coil's voltage drop (e.g., due to resistance) which makes the calculation of the load angle unreliable. In addition, in a low motor velocity scenario, the load angle calculation may vary due to temperature related coil resistance, BBM delays, measurement errors, and to parasitic effects. For this reason, at low motor velocities it is difficult for a stepper motor controller to detect motor stall. A low motor velocity (at which the received load values can be compromised by parasitic effects) may be determined if the motor Back-EMF voltage is lower than the resistive voltage drop in a motor coil caused by coil current.

The disclosed method is designed to extend this limit to at least velocities 4 to times lower than standard techniques. It uses a floating mean value (generated by a moving average calculation) of the sensorless load value to get a much more stable and noise-free read out and reacts to a change in the load value corresponding to hitting a mechanical obstacle, rather than to an absolute load. This makes it insensitive to slow changes like thermal heat up of the motor coils leading to increased coil resistance.

Figure 5:
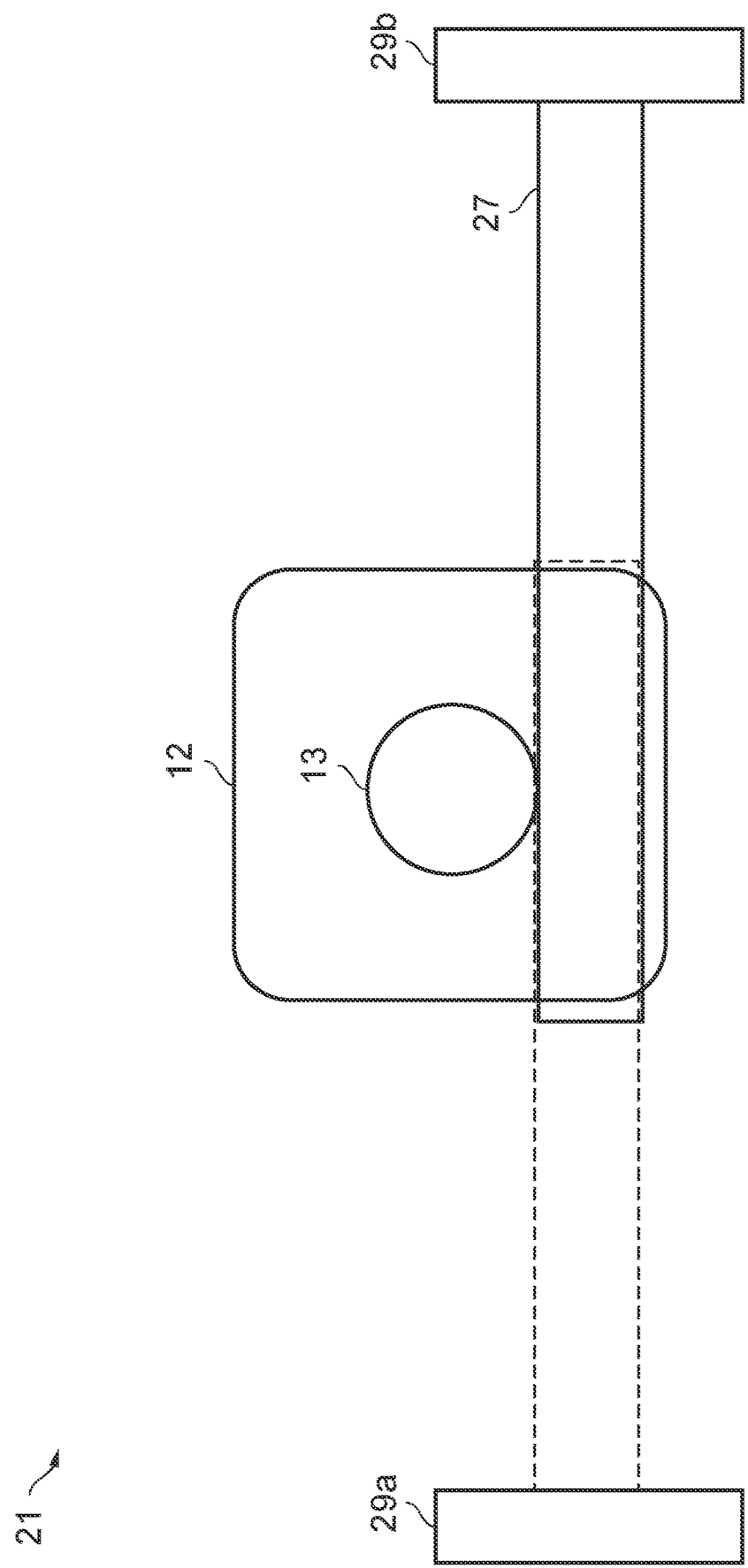
FIG. 5 illustrates a system comprising a stepper motor with a rotor coupled to a linear actuator.

FIG. 5 shows an example of a system 21 comprising a stepper motor 12 with a rotor 13 (of the stepper motor) coupled to a linear actuator 27. The linear actuator 27 is limited by endpoints 29a, 29b such that the first endpoint 29b mechanically limits the rotation of the stepper motor 12 when the linear actuator 27 reaches the first endpoint 29b. The stepper motor 12 is coupled to the controller 26 to implement any method disclosed herein.

The disclosed method is particularly useful when applied to a stepper motor coupled to a system with at least a first [pre-defined] endpoint which mechanically limits the rotation of the stepper motor when a component of the system reaches the first endpoint, e.g., a linear actuation system. In such systems, the mechanical endpoints of the stepper motors rotor are typically detected with distinct switches at either end of the system. Advantageously, the current system enables detection of the mechanical endpoints (of the stepper motors rotor) to be achieved without additional components.

Figure 6:
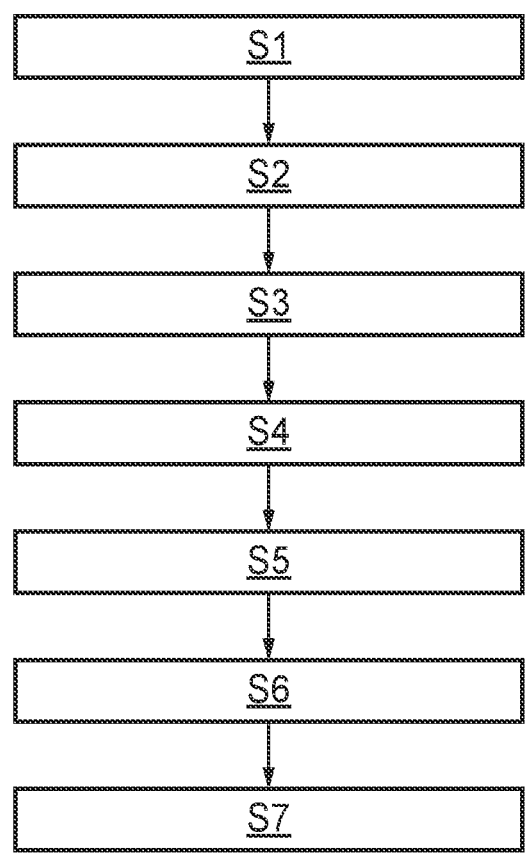
FIG. 6 illustrates a process of operating a stepper motor to determine a stall condition.

FIG. 6 shows an exemplary method of the present disclosure implemented by the controller 26.

At Step S1, the controller 26 operates the stepper motor in a control loop;

At Step S2, the controller 26 receives load values associated with a mechanical load of the operating stepper motor;

At Step S3, the controller 26 filters the load values to generate stall detection values;

At Step S4, the controller 26 determines a step value based on the [magnitude] difference between two stall detection values;

At Step S5, the controller 26 compares the step value to a predetermined threshold;

At Step S6, the controller 26 determines that the stepper motor is in a stall condition at least based on the comparison between the step value to the predetermined threshold; and At optional Step S7, the controller 26 stops the stepper motor in response to determining that the stepper motor is in the stall condition. This Step S7, may be used to reset the stepper motor 12, or to provide an indication that the rotor of the stepper motor 12 has reached a mechanical minimum or maximum. For example, the stepper motor 12 may be coupled to a mechanical system with mechanical endpoints (optionally, these end points are pre-defined) which mechanically limit the rotation of the stepper motor. Such a mechanical system may be a linear actuator (e.g., rack and pinion, or as shown in FIG. 5), or other actuator. In known mechanical systems, switches may be used to indicate that the motor has reached a mechanical minimum or maximum. However, when the method above is implemented by the controller 26, no such additional switches are required to indicate that the motor has reached a mechanical endpoint.

Additionally, at Step S7, upon determining that the stepper motor is in the stall condition, the controller 26 may be configured to stop and reverse the stepper motor (i.e., move back a bit) to a position after which the torque initially started increasing. That is, to a position where the step value exceeded the predetermined threshold. Advantageously, this may allow for the removal of strain from the stepper motor and any associated mechanical apparatus.

The controller 26 of the stepper motor 12 may determine that the method should be implemented if the controller 26 detects (or commands that) the stepper motor 12 is operating at a low velocity. Alternatively, the controller 26 of the stepper motor 12 may determine that the method should be implemented if the controller 26: determines the absolute value of the Back-EMF of the stepper motor 12; and compares the absolute value of the Back-EMF (as determined from a motor Back-EMF constant multiplied by the commanded operating velocity) to the absolute value of the temperature dependent change of resistive voltage drop in the motor coils (as determined by coil resistance change multiplied by motor current. Coil resistance change can be determined by expected motor temperature change during operation multiplied by the specific temperature coefficient (i.e. 0.038/K for copper). If the voltage drop due to effect of resistance change is significant (e.g., more than 10% of Back-EMF), then the method described herein may be beneficially used.

Figure 7:
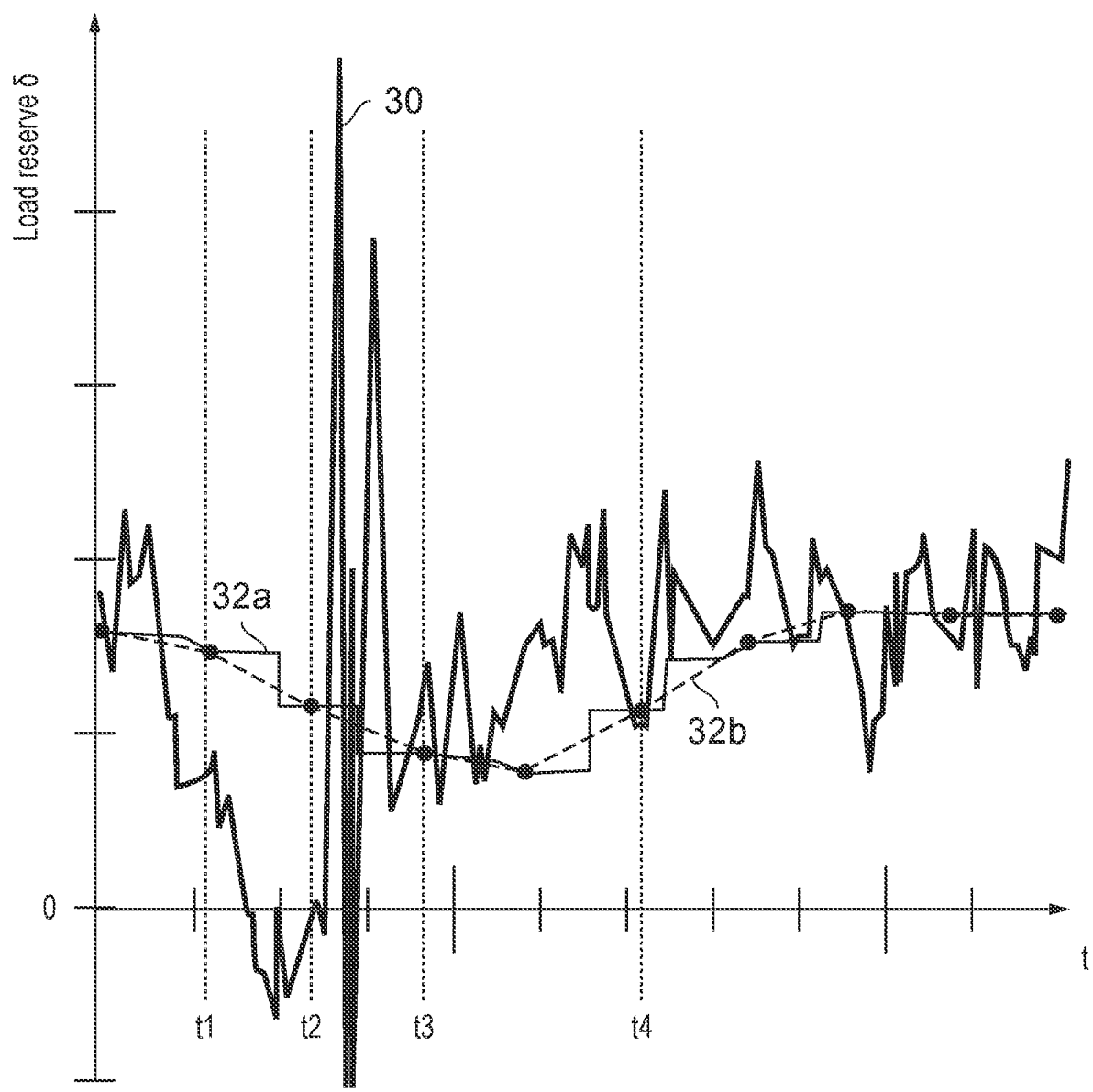
FIG. 7 shows a graph with a load reserve (8) amplitude on the y-axis and time (t) on the x-axis, wherein the mechanical load on the stepper motor is varied.

FIG. 7 shows a graph with a load value amplitude on the y-axis (specifically, a load reserve δ), by time on the x-axis (i.e., t). The graph of FIG. 7 represents operational data from the stepper motor 12. The load values received or calculated by the controller 26 are shown by line 30, and are associated with the mechanical loads detected (that is, experienced) by the operating stepper motor over time. In FIG. 7, the load values are shown as a continuous line 30, however, the load values may be discretely calculated or determined. Stall detection values are shown by lines 32a, 32b. Line 32a shows the step value change between consecutive stall detection values. Line 32b shows the gradient between consecutive stall detection values. Stall detection values are determined by filtering the load values (or a sampled version of line 30 generated from the load values), that is, lines 32a, 32b are a filtered representation of line 30.

FIG. 7 shows captured experimental data of an operating stepper motor 12. The stepper motor 12 is operating at a low velocity. At point (t1), the mechanical load of the operating stepper motor 12 increases. Before point (t2), the stepper motor 12 experiences a sudden mechanical load increase due to a sudden blocking of the rotor, or due to a mechanical limit of the rotor being reached. It can be seen from FIG. 7, that this causes a change between two stall detection values at point (t1) and point (t2), and also a change between two stall detection values at point (t2) and point (t3). In general, the sudden mechanical load increase causes a change in consecutive and/or subsequent stall detection values. This change in subsequent stall detection values can be quantified as a step value. If the step value is greater than a predetermined threshold, then this indicates a stall event. At point (t4), the cause of the increased mechanical load is overcome, and the stepper motor 12 may be operated under normal conditions.

A stepper motor stall condition may be detected from a change between only two stall detection values, or may detected from a change over multiple stall detection values. That is, the change (i.e., the step value) is compared to a predetermined threshold to determine that the stepper motor 12 is in a stall condition. The predetermined threshold may be an absolute value, or it may represent a rate of change (i.e., a gradient) of the stall detection values and/or line 32b.

In general, a rate of change of the stall detection values may be used to determine that the stepper motor is in a stall condition. The steepness of the gradient of the line 32b connecting the stall detection values correlates to more mechanical resistance on the stepper motor rotor. Therefore, the rate of change in the stall detection values may be compared to a predetermined threshold to determine if the stepper motor is in a stall condition. The predetermined threshold may be pre-determined based on the application of the stepper motor, and/or found via stepper motor experimentation. The stall condition may signal that the stepper motor has stalled, or that the stepper motor is at risk of stalling (i.e., if the mechanical load increases further, then the stepper motor will stall). The predetermined threshold may be an absolute value, for example, if the change between two stall detection values occurs over a known time period between the two stall detection values. For example, depending on the filtering type the time period may be determined or estimated based on the sampling rate of the load values. The step value may be determined from consecutive stall detection values, or the step value may be determined from any two stall detection values with a known time period between them. Therefore, determining that the step value is based on the difference between two stall detection values can comprise determining the rate of change in the stall detection values. In addition, comparing the step value to the predetermined threshold may comprise comparing the rate of change in the stall detection values to the threshold, wherein the predetermined threshold is a rate of change threshold.

Advantageously, by taking into account the time period between stall detection values and/or the rate of change of the stall detection values, then the method may be unaffected by non-load dependent operational conditions of the stepper motor 12. For example, the stepper motor temperature or thermal heat up of the stepper motor.

FIG. 8 shows a graph with a load value amplitude on the y-axis (specifically, a load reserve δ determined from motor coil currents), by time on the x-axis (i.e., t). The graph of FIG. 8 represents operational data from the stepper motor 12 which has a constant mechanical load. Over time, the temperature of the stepper motor 12 rises which affects the resistance of the stepper motor coils. Therefore, since the load value is a function of motor coil currents, then as the temperature increases over time, the load reserve decreases. This change (and other non-load dependent operational conditions of the stepper motor 12) occurs over a relatively large time period, which may be neglected by setting the predetermined threshold to account for the time period between stall detection values and/or the rate of change of the stall detection values.

Filtering the load values comprises averaging the load values, for example, with a moving average. The moving average averages a defined set of load values (i.e., a window). Although, other methods of filtering may be used such as, smoothing, low pass filtering, etc.

Figure 9A:
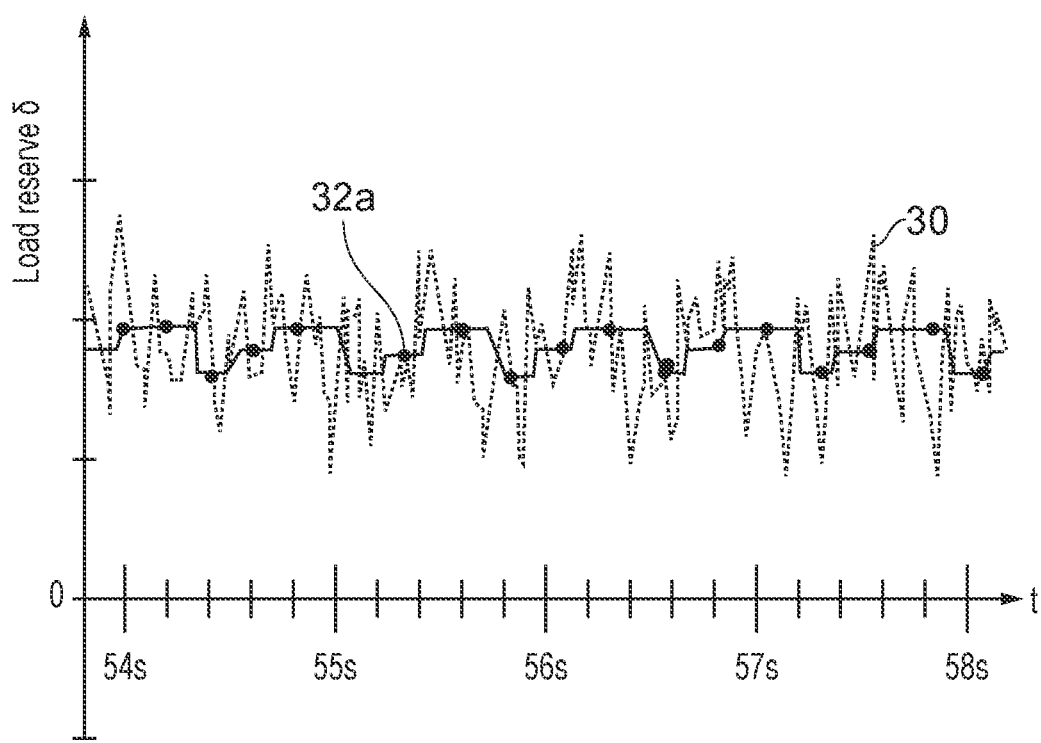
FIG. 9a shows a graph with a load reserve (8) amplitude on the y-axis and time (t) on the x-axis, wherein the mechanical load on the stepper motor is constant and load reserve values are averaged using a moving average with a window of a quarter of the electrical cycle.
Figure 9B:
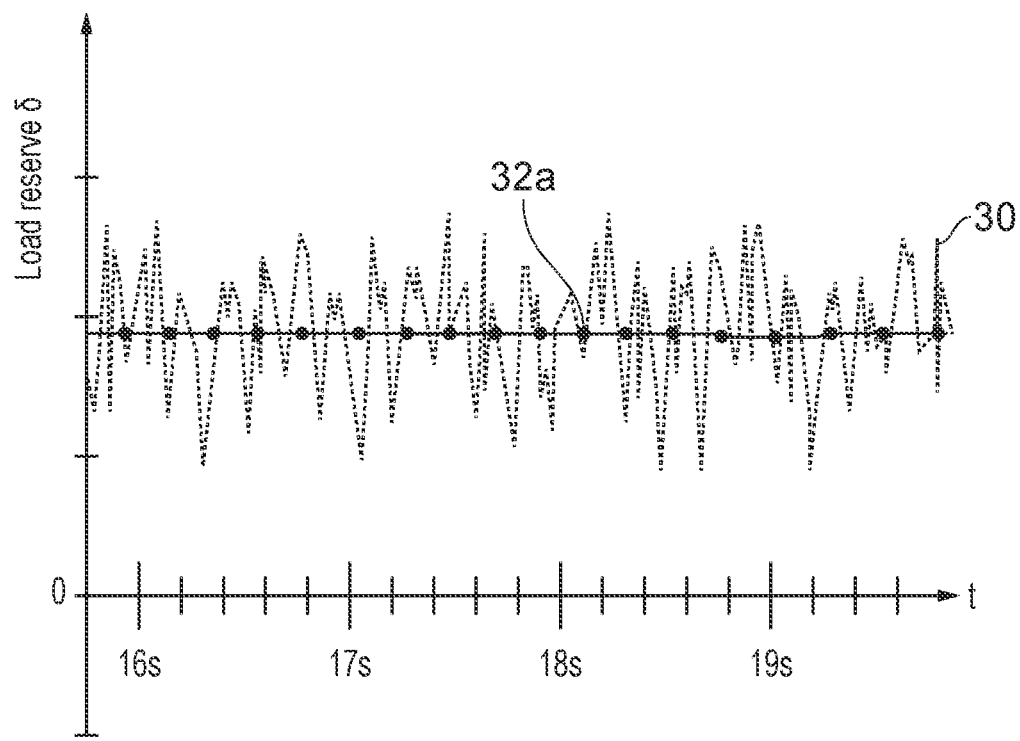
FIG. 9b shows a graph with a load reserve (8) amplitude on the y-axis and time (t) on the x-axis, wherein the mechanical load on the stepper motor is constant and load reserve values are averaged using a moving average with a window of a full electrical cycle.

FIGS. 9a and 9b both show a graph with a load value amplitude on the y-axis (specifically, a load reserve δ), by time on the x-axis (i.e., t). The graph of FIGS. 9a, 9b represents operational data from the stepper motor 12 which has a constant mechanical load, and load values are averaged using a moving average with a window.

FIG. 9a filters the load values (to determine the stall detection values) by averaging the load values over 90 degrees of an electrical cycle of current in a motor coil of the stepper motor 12. That is, the window of the moving average is 90 degrees of an electrical cycle of current in a motor coil of the stepper motor 12. FIG. 9a shows a repeating pattern of stall detection values, which each consist of four stall detection values before repeating. This effect has been found to occur as a result of the stepper motor manufacturing process. A benefit of selecting the window as 90 degrees of an electrical cycle of current in a motor coil of the stepper motor 12, is that the system may be able to react quickly to a possible stall condition. In addition, as a result of the window size, the filtered signal (i.e., stall detection values) will reduce when indicating a stall condition (but may not reach 0).

The effect of a repeating pattern of stall detection values (as shown in FIG. 9a) may be reduced or eliminated by decreasing component tolerances of the stepper motor, or as shown in FIG. 9b, by averaging the load values over one electrical cycle of current in a motor coil of the stepper motor. That is, in FIG. 9b, the window of the moving average is a whole electrical cycle of current in a motor coil of the stepper motor 12. Advantageously, the stability of the stall detection method is improved by averaging the load values over one electrical cycle of current in a motor coil of the stepper motor. Although, the stall detection values would not necessarily reach maximum load (0 load reserve), when the motor becomes overloaded (i.e., the stepper motor is in a stall condition), as the motor might stall before the filter has covered a full electrical period. Theoretically, a sudden stop of the rotor starting with 0-load will lead to a step loss in ½ electrical period. Practically, limited mechanical stiffness of the stepper motor system will lead to a non-instantaneous and longer period where load increases, until the motor stalls. The stall detection values would thus result in at least two consecutive step value decreases. This result may enable the system to determine that the stepper motor 12 is in a stall condition. Although the system would be able to react faster with a smaller window of the moving average (as discussed at FIG. 9*a*). Therefore, a combination of different filters (such as that of FIGS. 9*a* and 9*b*) may be used to determine that the stepper motor 12 is in a stall condition.

The window of the moving average may be any fraction of the electrical cycle of current in a motor coil of the stepper motor or rotation. However, it should be taken into account that measurement noise may only be cancelled out by filtering over somewhat higher periods (i.e., greater than 45 degrees of an electrical cycle), as shown herein.

At low velocity, the change between stall detection values may vary based on the response to the mechanical load. For example, the change between stall detection values may become reduced with the mismatch between motor coil resistance and measured/estimated motor coil resistance. Therefore, the predetermined threshold may be adapted to represent an absolute value between the stall detection values when the stepper motor 12 is determined to be running without a mechanical load. In addition, the predetermined threshold may be adapted to represent the gradient between the stall detection values when the stepper motor 12 is determined to be running with a mechanical load. Therefore, the predetermined threshold may be predetermined: before the stepper motor is operated; based on a determination that the stepper motor is operating with a mechanical load; or based on a determination that the stepper motor is operating in one of many operating scenarios.

The time period between consecutive stall detection values may be calculated based on a known load value sampling rate. The length of the moving average window as a ratio of an electrical cycle may be determined based on the known load value sampling rate or the time period.

In an example, if the load values represent the load reserve δ, the change in subsequent stall detection values is a decrease. In another example, if the load values represent the load angle, the change in subsequent stall detection values is an increase. In another example, if the load values represent the mechanical torque, the change in subsequent stall detection values is an increase. That is, the change, either an increase or decrease, between subsequent stall detection values depends on the particular load values received.

A stepper motor stall condition may be detected from a change over multiple stall detection values. For example, returning to FIG. 7, a first step value may be determined based on the difference between the first stall detection value at point (t1), and the second stall detection value at point (t2), and a second step value may be determined based on the difference between the second stall detection value at point (t2) and a third stall detection value at point (t3). A combination of the first and second step values may be compared to the predetermined threshold (for example, the combination may be an average of any type: mean, weighted, etc.). The method may determine that the stepper motor is in a stall condition based on the comparison between the combination of the first and second step values to the predetermined threshold. Alternatively, the first step value may be compared to a first predetermined threshold, the second step value may be compared to a second predetermined threshold, and only if both the first and second predetermined thresholds are exceeded is a stall condition detected. The first and second predetermined thresholds may be equivalent.

NUMBERED CLAUSES

By way of non-limiting example, some aspects of the disclosure are set out in the following numbered clauses.

Clause 1: A method of operating a stepper motor, the method comprising:
operating the stepper motor in a control loop;
receiving load values associated with a mechanical load of the operating stepper motor;
filtering the load values to generate stall detection values;
determining a step value based on the difference between two stall detection values;
comparing the step value to a predetermined threshold; and
determining that the stepper motor is in a stall condition based on the comparison between the step value to the predetermined threshold.

Clause 2: The method of clause 1, wherein filtering the load values comprises averaging the load values over at least 90 degrees of an electrical cycle of current in a motor coil of the stepper motor.

Clause 3: The method of any of clauses 1 or 2, wherein filtering the load values comprises averaging the load values over one electrical cycle of current in a motor coil of the stepper motor.

Clause 4: The method of any preceding clause, wherein comparing the step value to the predetermined threshold comprises comparing the rate of change in the stall detection values to the predetermined threshold, wherein the predetermined threshold is a rate of change threshold.

Clause 5: The method of any preceding clause, wherein load values are received by: sampling a first motor coil current from the first motor coil; and sampling a second motor coil current from the second motor coil.

Clause 6: The method of any preceding clause, wherein each load value is proportional to a load angle of the stepper motor.

Clause 7: The method of any preceding clause, wherein the load values are associated with the mechanical loads detected by the operating stepper motor.

Clause 8: The method of any preceding clause, wherein filtering the load values comprises averaging the load values.

Clause 9: The method of any preceding clause, wherein determining the step value is further based on the difference between two consecutive stall detection values.

Clause 10: The method of any preceding clause, further comprising stopping the stepper motor in response to determining that the stepper motor is in a stall condition.

Clause 11: The method of any preceding clause, wherein determining that the step value is based on the difference between two stall detection values comprises determining the rate of change in the stall detection values.

Clause 12: The method of any preceding clause, wherein the two stall detection values are a first and second stall detection values, and the step value is a first step value;
  determining a second step value based on the difference between the second stall detection value and a third stall detection value;
  comparing the combination of the first and second step values to the predetermined threshold; and
  determining that the stepper motor is in a stall condition based on the comparison between the combination of the first and second step values to the predetermined threshold.

Clause 13: The method of any of clauses 1 to 11, wherein the two stall detection values are a first and second stall detection values, the predetermined threshold is a first predetermined threshold, and the step value is a first step value;
  determining a second step value based on the difference between the second stall detection value and a third stall detection value;
  comparing second step values to a second predetermined threshold; and
  determining that the stepper motor is in a stall condition based on: the comparison between the first step value to the first predetermined threshold; and, the comparison between the second step value to the second predetermined threshold.

Clause 14: The method of any preceding clause, wherein operating the stepper motor in a control loop comprises operating the stepper motor at less than: 60, 30, 20 or 10 revolutions per minute.

Clause 15: A circuit arrangement for operating a stepper motor in a control loop, the circuit arrangement comprising:
  a controller, configured to:
    operate the stepper motor at a velocity:
    receive load values associated with a mechanical load of the operating stepper motor;
    filter the load values to generate stall detection values;
    determine a step value based on the difference between two stall detection values;
    compare the step value to a predetermined threshold; and
    determine that the stepper motor is in a stall condition based on the comparison between the step value to the predetermined threshold.

Clause 16: The circuit arrangement of clause 15, wherein the controller is further configured to stop the stepper motor in response to determining that the stepper motor is in a stall condition.

Clause 17: The circuit arrangement of any of clauses 15 or 16, wherein filtering the load values comprises averaging the load values over at least 90 degrees of an electrical cycle of current in a motor coil of the stepper motor.

Clause 18: The circuit arrangement of any of clauses 15 to 17, wherein filtering the load values comprises averaging the load values over one electrical cycle of current in a motor coil of the stepper motor.

Clause 19: The circuit arrangement of any of clauses 15 to 18, wherein comparing the step value to the predetermined threshold comprises comparing the rate of change in the stall detection values to the predetermined threshold, wherein the predetermined threshold is a rate of change threshold.

GENERAL

Each block of FIG. 1 and FIG. 3 is shown and defined for explanatory purposes only, it would be well understood that the algorithm or function which each block represents may be implemented in a plurality of other ways so long as the functionality as described is present. For example, the blocks of FIGS. 1 and/or 3 may be combined and implemented as part of a circuit arrangement, on a single integrated circuit, processor, or computer, or implemented by a plurality of circuit arrangements, integrated circuits, processors, and/or computers. That is, the controller comprises one or more circuit arrangements, integrated circuits, processors, and/or computers.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to."

The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

It is to be understood that one or more features from one or more of the above-described embodiments may be combined with one or more features of one or more other ones of the above-described embodiments, so as to form further embodiments which are within the scope of the appended claims.

What is claimed is:

1. A method of operating a stepper motor, the method comprising:
  operating the stepper motor in a control loop;
  receiving load values associated with a mechanical load of the stepper motor;
  filtering the load values to generate stall detection values;
  determining a step value based on a difference between two stall detection values sampled at respective different times;
  determining a comparison between the step value and a predetermined threshold; and
  determining the stepper motor is in a stall condition based on the comparison between the step value and the predetermined threshold.

2. The method of claim 1, wherein filtering the load values comprises averaging the load values over at least 90 degrees of an electrical cycle of current in a motor coil of the stepper motor.

3. The method of claim 1, wherein filtering the load values comprises averaging the load values over one electrical cycle of current in a motor coil of the stepper motor.

4. The method of claim 1, wherein comparing the step value to the predetermined threshold comprises comparing a rate of change in the stall detection values to the predetermined threshold, wherein the predetermined threshold is a rate of change threshold.

5. The method of claim 1, wherein receiving the load values comprises:
  sampling a first motor coil current from the first motor coil; and sampling a second motor coil current from the second motor coil.

6. The method of claim 1, wherein receiving the load values comprises sampling the load values, the load values being proportional to a load angle of the stepper motor.

7. The method of claim 1, wherein receiving the load values comprises sampling the load values, the load values being associated with mechanical loads detected by the stepper motor.

8. The method of claim 1, wherein filtering the load values comprises averaging the load values.

9. The method of claim 1, wherein determining the step value based on the difference between the two stall detection values includes determining the step value based on the difference between two consecutive stall detection values.

10. The method of claim 1, further comprising stopping the stepper motor in response to determining the stepper motor being in the stall condition.

11. The method of claim 1, wherein determining the step value comprises determining a rate of change in the two stall detection values.

12. The method of claim 1, wherein:
determining the step value based on the two stall detection values includes determining a first step value based on a first difference between a first stall detection value and a second stall detection value; and
further comprising:
determining a second step value based on a second difference between the second stall detection value and a third stall detection value;
determining a second comparison of a combination including the first step value and the second step value to the predetermined threshold; and
determining the stepper motor is in the stall condition based on the second comparison between the combination and the predetermined threshold.

13. The method of claim 1, wherein:
determining the step value based on the two stall detection values includes determining a first step value based on a first difference between a first stall detection value and a second stall detection value; and
determining the comparison between the step value and the predetermined threshold includes determining a first comparison between the first step value and a first predetermined threshold; and
further comprising:
determining a second step value based on a second difference between the second stall detection value and a third stall detection value;
determining a second comparison between the second step value and a second predetermined threshold; and
determining the stepper motor is in the stall condition based on the first comparison between the first step value and the first predetermined threshold, and the second comparison between the second step value and the second predetermined threshold.

14. The method of claim 1, wherein operating the stepper motor in the control loop comprises operating the stepper motor at less than 60 revolutions per minute.

15. A circuit arrangement for operating a stepper motor in a control loop, the circuit arrangement comprising:
a controller, configured to:
operate the stepper motor at a velocity:
receive load values associated with a mechanical load of the stepper motor;
filter the load values to generate stall detection values;
determine a step value based on a difference between two stall detection values at respective different times;
determine a comparison between the step value and a predetermined threshold; and
determine the stepper motor is in a stall condition based on the comparison between the step value and the predetermined threshold.

16. The circuit arrangement of claim 15, wherein the controller is further configured to stop the stepper motor based on the stepper motor being in the stall condition.

17. The circuit arrangement of claim 15, wherein the controller configured to filter, further includes the controller configured to average the load values over at least 90 degrees of an electrical cycle of current in a motor coil of the stepper motor.

18. The circuit arrangement of claim 15, wherein the controller configured to filter, further includes the controller configured to average the load values over one electrical cycle of current in a motor coil of the stepper motor.

19. The circuit arrangement of claim 15, wherein the controller configured to determine the comparison, further includes the controller configured to compare a rate of change in the stall detection values to the predetermined threshold, wherein the predetermined threshold is a rate of change threshold.

20. The circuit arrangement of claim 15 wherein the controller configured to receive the load values associated with the mechanical load of the stepper motor is further configured to:
sample a first motor coil current from a first motor coil; and
sample a second motor coil current from a second motor coil.

* * * * *